United States Patent [19]

Erratico et al.

[11] Patent Number: 4,752,722
[45] Date of Patent: Jun. 21, 1988

[54] CONTROL CIRCUIT WITH COMPENSATION OF THE ANODE VOLTAGE VARIATION FOR TELEVISOR VERTICAL DEFLECTION STAGE

[75] Inventors: Pietro Erratico, Milano; Mauro Merlo, Villasanta; Silvano Coccetti, Vittuone, all of Italy

[73] Assignee: SGS Microelettronica S.p.A., Catania, Italy

[21] Appl. No.: 836,116

[22] Filed: Mar. 4, 1986

[30] Foreign Application Priority Data

Mar. 5, 1985 [IT] Italy ............................... 19760 A/85

[51] Int. Cl.$^4$ ..................... H01J 29/70; H01J 29/76
[52] U.S. Cl. ................................. 315/403; 315/370
[58] Field of Search ............... 315/403, 411, 370, 371; 358/180

[56] References Cited

U.S. PATENT DOCUMENTS 3,988,638 10/1976 Nillesen ........................... 315/403
4,199,785 4/1980 McCullough et al. ............ 358/180

Primary Examiner—Theodore M. Blum
Attorney, Agent, or Firm—Cushman, Darby & Cushman

[57] ABSTRACT

An amplifier stage with variable gain dependent on the anode voltage is interposed between a ramp generator having constant amplitude ramp output voltage and the vertical deflection stage in such a manner as to vary the input voltage of said vertical deflection stage in accordance with anode voltage variations. In such a manner the vertical deflection current varies correspondingly.

5 Claims, 1 Drawing Sheet

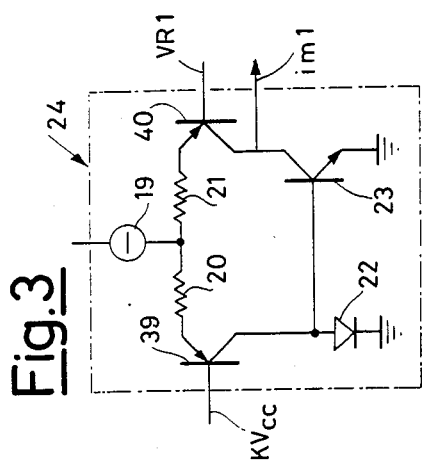
Fig. 1
Fig. 2
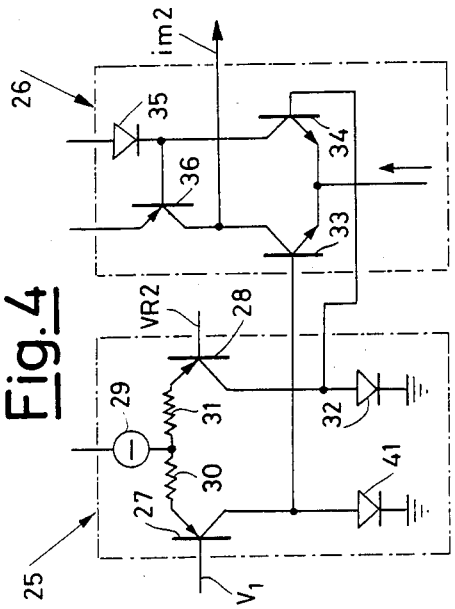
Fig. 3
Fig. 4

CONTROL CIRCUIT WITH COMPENSATION OF THE ANODE VOLTAGE VARIATION FOR TELEVISOR VERTICAL DEFLECTION STAGE

The present invention relates to a control circuit with compensation of the anode voltage variations for televisor vertical deflection stage.

To supply the vertical deflection stages of televisors whether black and white or colour it is usual to have recourse to a ramp generator with constant amplitude ramp output voltage which under all operating conditions enables the deflection stage to produce a deflection current, also of constant amplitude.

Said ramp generator takes the control voltage from the secondary of the same line transformer which supplies the anode voltage of the cathode ray tube and employs for charging a ramp generating capacitance a constant current generator which makes it insensitive to any supply voltage variations.

It is also known that any time the image has a high white content the beam current of the cathode ray tube increases considerably and brings about consequently a considerable decrease in the anode voltage due to drop on the supply transformer secondary.

The deflection current being constant so that the magnetic flux which causes the deflection is correspondingly constant, an erroneously amplified image appears on the screen.

To avoid this shortcoming and secure an undistorted image it is necessary to control the deflection current in such a manner as to allow for the decrease in the anode voltage and compensate for the effect thereof.

A solution known at present acts on the ramp generator, modifying its structure in such a manner as to make it deliver an output ramp whose value depends on its control voltage and hence on the anode voltage.

This solution is based on the replacement of the constant current generator by an electrical resistance with high value which is consequently traversed by a charge current dependent upon the control voltage. Due to the fact that said control voltage varies for the noted reasons the charging current of the capacitance varies and hence also the ramp voltage, which is then used by the vertical deflection stage to generate a deflection current which is variable in a similar manner.

In this manner it is, however, difficult to obtain accurate compensations for the anode voltage variations. The system also has poor versatility, not being usable in existing televisors since not all the presently available integrated structures allow use of a resistance in place of the conventional current generator.

The object of the present invention is to accomplish a control circuit for the vertical deflection stage which would allow compensation with considerable accuracy for any anode voltage variations and which would also be promptly employable without problems in existing televisors as well as in those of the ensuing generation.

In accordance with the invention said object is achieved with a control circuit which comprises in a known manner a ramp generator with constant amplitude ramp output voltage for piloting the vertical deflection stage characterized in that it comprises also an amplifier stage with a variable gain dependent upon the anode voltage, interposed between said ramp generator and said deflection stage to vary the input voltage of said deflection stage in accordance with anode voltage variations.

In this manner it is possible to obtain accurate compensations for the anode voltage variations without recourse to modification of conventional components and hence with the possibility of immediate use in existing televisors. It not being required to act on the ramp generator, it is also possible to provide for the employment of the solution according to the invention in combination with ramp generators of any type, even digital, as will presumably be required by televisors of the ensuing generation.

The high accuracy is due principally to the fact that to the gain control also contributes, in addition to the usual deflection stage (conventionally with unitary gain amplifier), a variable gain amplifier stage which can readily be selected in such a manner as to give a gain which is a fraction of the unitary value. In this manner any errors introduced by the variable gain amplifier have negligible effect.

It is also possible to provide the variable gain amplifier stage with high input impedance so as to improve linearity and allow if required the use of a digital ramp generator (of "pulse width modulation" type).

Finally, the variable gain amplifier stage and the deflectin stage can be included in a single integrated structure from which protrude the usual deflection stage pins. In this case there is a modified component which can readily take the place of conventional deflection stages, thus solving the problem of compensation for the anode voltage variations annd avoiding the creation of other during assembly.

The characteristics of the present invention will be made clearer by the following detailed description of a practical embodiment thereof which is illustrated as an example in the annexed drawings wherein:

FIG. 1 shows a general block diagram of the control circuit in accordance with the invention, FIG. 2 shows a more detailed diagram of the variable gain amplifier stage included in the circuit in accordance with the invention, FIG. 3 shows the circuit details of a current generator included in the aforesaid variable gain amplifier stage, and FIG. 4 shows the circuit details of a voltage multiplier included in the aforesaid variable gain amplifier stage.

With reference to FIG. 1 there are shown a ramp generator 1 with a constant amplitude ramp output $V_1$ and a circuit deflection stage 2, both of known types in themselves, between which is inserted a variable gain amplifier stage 3 which is controlled by the control voltage $V_{cc}$ in such a manner as to convert the constant voltage $V_1$, available at the output of the ram generator 1 into an input voltage $V_2$ of the deflection stage 2 which varies in accordance with the variations of said voltage $V_{cc}$.

As shown, the ramp generator 1 includes a constant current generator 4 which charges a capacitance 5 which is on the other hand periodically discharged by conduction of a transistor 6 with the base controlled by the synchronism pulses. Consequently, as already said, a ramp voltage $V_1$ of constant value is generated.

The vertical deflection stage 2 comprises an operational amplifier 7 with feedback 8 whose output feeds the deflection current I at the vertical deflection yoke 9, having in series a capacitance 10 and a resistance 11. The current I varies therefore with the input voltage $V_2$ in accordance with the variations of the command voltage $V_{cc}$.

A possible embodiment of the variable gain amplifier stage 3 is illustrated in FIG. 2 and comprises a current generator 12, a voltage multiplier 13, and a voltage summing stage 14.

The current generator 12 has an input connected to an intermediate node 15 of a resistive divider 16 consisting of two resistances in series 17 and 18 and supplied with the voltage $V_{cc}$ while the other input is supplied with a constant reference voltage VR1. At the output of the current generator 12 there is hence present a current im1 of an intensity which varies with the variations of the control voltage $V_{cc}$ and hence of the cathode ray tube anode voltage.

The voltage multiplier 13, preferably having high input impedance, has in turn an input supplied with the ramp voltage $V_1$, another input supplied with the variable current im1, and another input supplied with the reference voltage VR1. There is consequently for the voltage multiplier 13 a gain, which varies with the current im1 and hence with the control voltage $V_{cc}$, from which is derived an output current im2 which is correspondingly variable. The basic gain of the voltage multiplier 13 is selected in such a manner as to be a fraction of the unitary value, e.g. 1/5.

The summing stage 14 consists of a unitary gain operational amplifier having a feedback resistance 37 which has an input supplied by the output current im2 of the voltage multiplier 13 and, by means of the resistance 38, from the ramp voltage $V_1$, whereas another input is supplied with the reference voltage VR2. At the output of the amplifier 14 there is hence present a voltage $V_2$ which reproduces the ramp voltage $V_1$ with a possible deviation dependent upon the variations in the control voltage $V_{cc}$ and hence in the cathode ray tube anode voltage.

The circuit details of a possible example of a current generator 12 are illustrated in FIG. 3 wherein it is seen to be made up of a differential stage 24 including two transistors PNP 39 and 40 with their bases supplied respectively with a fraction $KV_{cc}$ of the supply voltage $V_{cc}$ and with the reference voltage VR1. A current generator 19 supplies through the respective resistances 20 and 21 the emitters of the transistors 39 and 40 whose collectors are connected respectively to earth through a diode 22 and a transistor NPN 23 with the base connected to the collector of the transistor 39. The output current im1 is taken from the common collector of the transistors 40 and 23.

It is clear from FIG. 3 that the current im1 depends linearly on the control voltage $V_{cc}$ in accordance with the following relationship:

$$im1 = \frac{KV_{cc} - VR1}{R}$$

where R is the ohmic value of the resistances 20 and 21.

The circuit details of a possible example of a voltage multiplier 13 are in turn illustrated in FIG. 4 wherein it is seen to consist of two differential stages 25 and 26 which are connected together. The differential stage 25 comprises two transistors PNP 27 and 28 with their bases supplied respectively with the voltages $V_1$ and VR2. A constant current generator 29 supplies the emitters of the two transistors through respective resistances 30 and 31 whereas the collectors of said transistors are connected to earth through respective diodes 41 and 32. The differential stage 26 comprises in turn two transistors NPN 33 and 34 whose bases are connected respectively to the collectors of the transistors 27 and 28 of the differential stage 25. The emitters of the transistors 33 and 34, which are connected in common, are supplied with the current im1. The collectors of the transistors 34 and 33 are in turn connected to a positive supply through a diode 35 and a transistor PNP 36 with its base connected to the collector of the transistor 34. The output current im2 is taken from the common collectors of the transistors 33 and 36.

The gain G of this multiplier is given by the relationship:

$$G = \frac{1}{R} \cdot \frac{im1}{I_1}$$

where $I_1$ is the constant current generated by the generator 29 and R is the ohmic value of the resistances 30 and 31.

It appears clearly that the gain G varies with im1 which in turn varies with the supply voltage $V_{cc}$.

In general the following relationship applies for the variations of $V_{cc}$ and $V_2$:

$$\frac{\Delta V_2}{V_2} = \frac{\Delta V_{cc}}{V_{cc}} \cdot \frac{KV_{cc}}{KV_{cc} - VR1} \cdot \frac{im1}{I_1} \cdot \frac{1}{1 + \frac{im1}{I_1}}$$

from which it is clearly seen that by acting on a parameter such as im1 it is possible to obtain a number of compensations. For example, it is possible to obtain a 4% variation of voltage $V_2$.

We claim:

1. Control circuit for a televisor vertical deflection stage which has an anode voltage, comprising:
   a ramp generator with a constant amplitude ramp output voltage for piloting the vertical deflection stage; and
   an amplifier stage with a variable gain depending on said anode voltage, interposed between said ramp generator and said deflection stage, to vary an input voltage to said deflection stage in accordance with variations in said anode voltage.

2. Control circuit for television vertical deflection stage comprising:
   a ramp generator with constant amplitude ramp output voltage for piloting the vertical deflection stage, said ramp generator including an amplifier stage with variable gain depending on the anode voltage, said amplifier stage being interposed between said ramp generator and said deflection stage to vary the input voltage of said deflection stage in accordance with anode voltage variations,
   said variable gain amplifier stage comprising a current generator having an input supplied with a control voltage which varies with the anode voltage and another input supplied with a first reference voltage,
   a voltage multiplier having an input supplied with the output voltage of the ramp generator, another input supplied with the output current of said current generator and another input supplied with a second reference voltage, and
   a voltage summer having an input supplied with the output voltage of the ramp generator and with the output current of said multiplier and another input supplied with said second reference voltage.

3. Circuit in accordance with claim 2 characterized in that said voltage multiplier has a gain which is a fraction of the unitary value.

4. Circuit in accordance with claim 2 characterized in that said voltage multilier has high input impedence.

5. Circuit in accordance with claim 2 characterized in that said voltage summer consists of a unitary gain operational amplifier.

* * * * *